Jan. 19, 1932.                M. R. PIERCE                    1,841,912
                 APPARATUS FOR SOLVING PROBLEMS IN ASTRONOMIC
                    NAVIGATION AND SPHERICAL TRIGONOMETRY
                           Filed Aug. 9, 1928        2 Sheets-Sheet 1

INVENTOR
MAURICE R. PIERCE
BY
Warren S. Orton
ATTORNEY

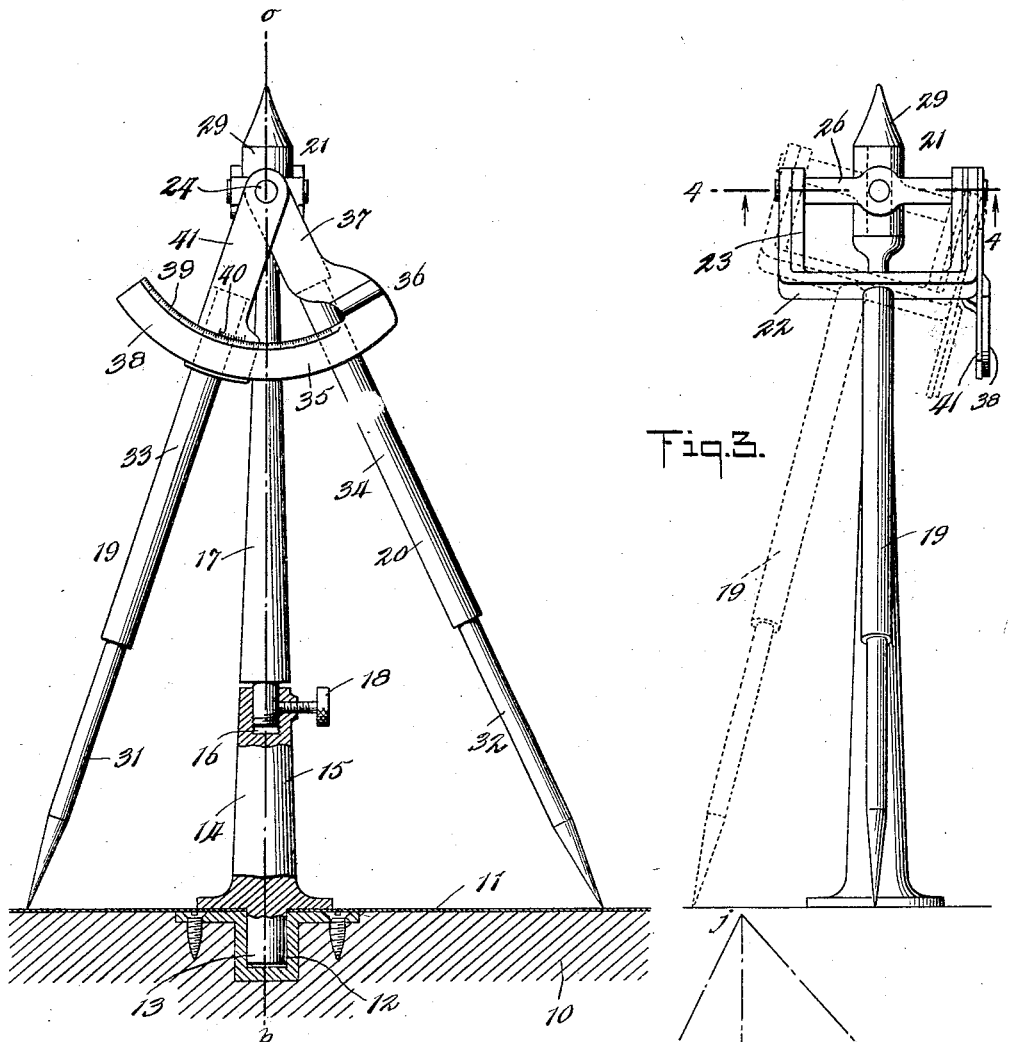
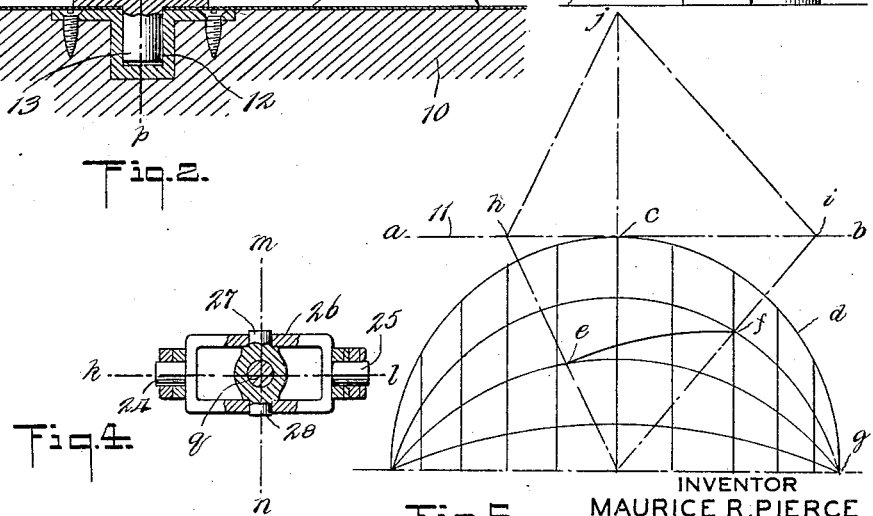

Patented Jan. 19, 1932

1,841,912

UNITED STATES PATENT OFFICE

MAURICE RUMFORD PIERCE, OF LAKEHURST, NEW JERSEY

APPARATUS FOR SOLVING PROBLEMS IN ASTRONOMIC NAVIGATION AND SPHERICAL TRIGONOMETRY

Application filed August 9, 1928. Serial No. 298,432.

The invention relates in general to a means for rapidly solving problems in spherical triangles, and specifically relates to a means for rapidly solving problems in astronomical and great circle navigation as in determining a position of the observer on the terrestrial sphere, or in obtaining great circle distances and courses.

The invention also relates to a mechanical, spherical triangle calculator, hereinafter called a gnomonic protractor, and the invention specifically relates to such a device designed for use in practicing the method hereinafter featured.

The primary object of the invention when considered in its method features is to provide a simple means for solving spherical triangles, such, for instance, as is required in determining a position on or above the earth's surface in navigating.

A further object of the invention is to provide a simplified form of mechanical protractor or calculator which will facilitate the solving of spherical triangles of any kind, and specifically to provide a simple form of nautical instrument which will enable the operator to ascertain quickly the altitude of a heavenly body for any assumed position, and thus lay down a line of position with a minimum of computation.

The invention features the use of a gnomonic chart and a pair of dividers for measuring the angle found between the points on the chart when the apex of the dividers is fixed at a definite point above the chart.

A gnomonic chart is understood to be a flat chart formed in a plane tangent to some point on a sphere and on which chart points on the surface of the sphere have been projected radially therefrom onto such tangent plane.

Referring to the explanatory Fig. 5, the line $a-b$ is a line in a plane tangent to the point $c$ of a sphere $d$ on the surface of which is a spherical triangle $efg$ to be solved. In this case the point of tangency $c$ is at the Equator and the apex $g$ is at the pole. Points $e$ and $f$ have been projected respectively to points $h$ and $i$ on the tangent plane so that the points $h$ and $i$ when recorded on a sheet of paper or other record form a gnomonic chart.

Considered broadly in its method aspects, the invention consists in forming a flat chart on which have been projected gnomonically two points corresponding to two apices of the triangle to be solved, forming, in space above the chart, a plane triangle with its base in the plane of said chart and its ends coinciding with said points, the apex of the angle opposite said line being located at a point in a line perpendicular to said chart at its point of tangency and spaced therefrom a distance corresponding to the radius of the sphere for the scale on which the chart was prepared. The angle at said apex is the arc distance between said points in the triangle to be solved.

Referring to Fig. 5 for a specific illustration of this method, it will be understood that the spherical triangle $efg$ may be solved on the gnomonic chart at $ab$ by erecting a solving plane triangle $hij$ above the chart with the apex $j$ in a line $cj$ perpendicular to the plane $ab$ erected at the point of tangency and spaced therefrom a distance equal to the radius of the sphere $d$. Measuring the angle $hji$ will give the arc distance of the side $ef$ of the spherical triangle.

Considered in its mechanical aspects, this object of the invention is attained mechanically by providing a gnomonic chart, disposing a pair of dividers or protractors with its apex spaced from the point of tangency of the chart a distance equal to the radius of the sphere for the scale on which the projection on the chart is made, and having extensible legs to reach any selected pair of points on the chart. The angle between the legs of the dividers will give the arc distance in the great circle passing through said points.

In its application to nautical astronomy, there is used a gnomonic chart of a portion of the earth's surface including the latitudes in which the voyage is being made, and on which chart can be marked the geographical location of one or more of the heavenly bodies. In this case, if one of the points of the dividers is set on the geographic location of the heavenly body indicated on the chart and the other point of the divider is set on the dead reckoning latitude and the hour angle of the body, the angle between the pointers will represent the zenith distance of the heavenly body and ninety degrees minus such zenith distance will give the altitude of the heavenly body.

A comparison of the observed altitude of the heavenly body with this altitude, computed by the device herein featured, will give in minutes the difference in nautical miles of the dead reckoning position from the true position at which the observation is taken.

Among the other objects of the invention is to provide a simplified means whereby the amount of computation necessary to the finding of the ship's position at sea may be reduced to a minimum. Further objects will be apparent to those skilled in spherical geometry, in astronomy or in navigation from a study of the following description and claims.

In the accompanying drawings:

Fig. 2 is a view in side elevation of part of the structure shown in Fig. 1 with part of the dividers broken away to show the mounting of its relatively movable parts;

Fig. 3 is a view in full lines in end elevation of the showing in Fig. 2 viewing the same from the left side and showing in dotted outline the position of one of the legs when shifted out of the full line position;

Fig. 4 is a horizontal section view taken on the line 4—4 of Fig. 3, and

Fig. 5 is an explanatory view showing points on a spherical surface projected onto a gnomonic chart and showing the position of the spherical triangle to be solved and the plane solving triangle formed by the pair of dividers shown in Figs. 2-4.

Figure 1:
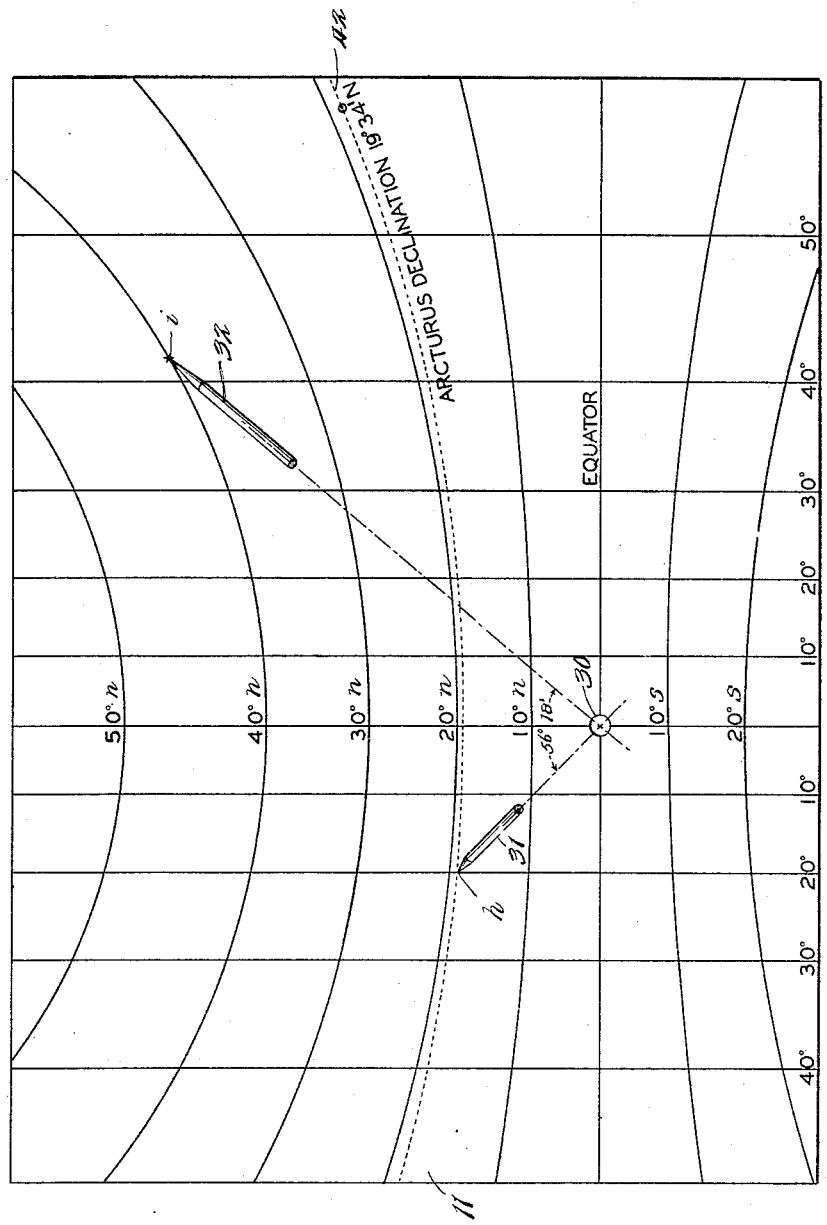
Fig. 1 is a plan view of a gnomonic chart, positioned on which is diagrammatic outline of a pair of dividers or protractors co-acting to form a preferred embodiment of the invention.

In the form of the invention herein selated for specific consideration, the gnomonic chart shown in Fig. 1 is prepared with the earth as the sphere and has its point of tangency at the Equator. In this case, the chart being a conventional form of great circle chart, has the latitude or declination, and longitude or hour angle lines, marked ten degrees apart. It is understood, however, that in the actual working chart the conventional forms showing every degree of latitude and hour angle will be delineated. The chart shown on Fig. 1, when subdivided into degrees, however, is serviceable from latitude 55° N. to latitude 25° S., and thus is serviceable for practically all the cruising done by ships except Arctic expeditions. It is understood, however, that the device herein disclosed is intended to be used with different gnomonic charts, the illustrated chart being intended for use where the latitude does not exceed 50° N. However, a chart may be selected, the point of tangency of which is at any other convenient point, say at latitude 40° N., or if cruising in a south polar region a gnomonic chart with the tangency at the south pole would be used.

In the accompanying drawings there is shown a flat board 10, or other suitable flat support, designed to have positioned thereon any one of a set of gnomonic charts, such as the great circle chart 11, shown in Fig. 1.

The support 10 is provided centrally thereof with a countersunk socket 12, adapted to receive and constitute a bearing for a cylindrical plug 13 forming the lower end of an upstanding standard 14, forming part of the dividers, protractor or calculator herein featured. The standard is formed of two parts, the lower part 15 of which is provided at its upper end with an open top socket 16 in which is adjustably mounted the upper part 17 secured in vertically adjusted position by means of a binding screw 18. This construction permits of any necessary small adjustments in the effective height of the standard to compensate for shrinkage or expansion of either the chart or instrument. The upper part 17 of the standard supports a pair of legs 19 and 20 coacting to constitute a pair of dividers mounted for universal articulation by means of a universal joint 21 at the top of the standard. The legs 19 and 20 terminate at their upper ends respectively in C-shaped yokes 22 and 23, which straddle and are each pivotally mounted on horizontally outstanding pins 24 and 25 projecting in alignment from opposite sides of a rectangular ring 26. This mounting permits a movement of the legs about an axis $k$—$l$. This ring is mounted on pins 27 and 28 projecting from opposite sides of a head 29 for rocking movement about an axis $m$—$n$ at right angles to the axis $k$—$l$.

The head 29 is mounted for rotary movement about a vertical axis $o$—$p$ extending through the point of tangency $c$ on the chart and through the intersection $q$ of the axes $m$—$n$ and $k$—$l$.

The apex of the angle formed by the legs 19 and 20, i. e., at the point $j$ of Fig. 5, is located a distance $c$—$j$ from the plane $a$—$b$ of any suitable chart positioned on the support 10 equal to the radius of the sphere on which the chart was formed, and in the illustrated case equal to the radius of the earth on the scale used in preparing the chart 11. The charts are each provided with an opening 30 at their points of tangency, so that the bearing plug 13 may be inserted therethrough, and thus each chart will be located accurately in position relative to the replaced dividers.

The legs of the divider are extensible so as to reach to any pair of desired points which as h—i on the chart, and for this purpose the pointers 31 and 32 forming respectively the free ends of the legs 19 and 20 are arranged telescopically with relation to the apex forming parts 33 and 34 carried by the standard. These pointers are held in adjusted position frictionally or by any other means usual in adjustable legs of measuring instruments.

In order to measure the angle distance between the legs by direct reading, a vernier scale 35 is provided. This scale includes an L-shaped member 36 with one arm 37 secured to one side of the yoke 23 and having an arcuate arm 38 provided with graduations 39. The graduated arm moves across and cooperates with a vernier scale 40 formed on a plate 41 secured to one side of the yoke 22. The graduations on this scale may be in degrees, minutes and seconds, to obtain by direct reading the actual angle formed between the legs 19 and 20, or one or more sets of graduations may be present to give other readings.

For instance, a set of graduations may be used which will give by direct reading 90° minus the angle formed between the legs as would be convenient when altitude is desired or the scale may be double so that either zenith distance or altitude can be read.

For convenience the chart 11 may contain, in addition to the usual longitude and latitude lines, the declinations of twenty to thirty fixed stars. In order to prevent confusion in the showing, only one of these stars, that is the declination of the fixed star Arcturus is shown, 42. At the time the chart 11 was designed for use, the declination of Arcturus was 19°—34′—N., and is so indicated by the dot and dash line 42.

In operation and assuming a specific case where the observer desires to ascertain quickly the altitude of a heavenly body for any assumed position, let us take the following example:

DR Lat. 40° 15′ N.  DR Long.=
                    41°—45′—15″ W=$2^h$—$47^m$—$01^s$
Took sight of Arcturus bearing west, altitude 33° 38.5′
GST of sight $21^h$—$07^m$—$27^s$.

$$\begin{array}{r}\text{h. m. s.}\\ \text{GST}=21-07-27\\ \text{DR. Long. W}=\ 2-47-01=41°-45′-15″\\ \hline \text{LST}=18-20-26\\ \text{RA}=14-12-23\\ \hline t=\ 4-08-03=62°-00′-45″\end{array}$$

$$\begin{array}{r}\text{h. m. s.}\\ \text{GST}=21-07-27\\ \text{Long. W}=\ 2-47-04=41°-46′\\ \hline \text{LST}=18-20-23\\ \text{RA}=14-12-23\\ \hline t=\ 4-08-00=62°.\end{array}$$

In such a position let us assume that the observer is using a chart whose point of tangency is based on the Equator as in Figures 1 and 5. Now the dead reckoning longitude 41°—45′—15″ W., equals $2^h$ $47^m$ $01^s$. Since the Greenwich sidereal time of the sight was $21^h$ $07^m$ $27^s$, and since the right ascension of Arcturus is $14^h$ $12^m$ $23^s$, we get an hour angle for the star Arcturus of $4^h$ $08^m$ $03^s$ as illustrated in the example above. This hour angle would involve angular measurements which would involve fractional parts of degrees, and for convenience on the chart a dead reckoning position is assumed which will make the hour angle equal to a definite and thus easily counted number of degrees of arc. Therefore, instead of using the dead reckoning longitude 40°—45′—15″ W., an assumed longitude of 40°—46′ W. is taken arbitrarily. This longitude equals $2^h$—$47^m$—$04^s$ giving an hour angle as shown in the example above of $4^h$ $08^m$ $0^s$ which equals 62 degrees of arc. Similarly, for convenience in measurement, instead of assuming the dead reckoning 40°—15′ N., we assume an even 40° of latitude. Thus we are ready to solve the problem with hour angle equal to 62° and latitude equal to 40°.

Now set one of the pointers of the dividers on any convenient hour circle at its point of intersection with the declination line of Arcturus, such as point h. The other point of the dividers is then placed on latitude 40° N. 62° of hour angle away from the first point as point i.

It should be remembered that the illustration of a gnomonic projection shown in Fig. 1, together with the points placed in specific locations on the chart, shows every even 10° of latitude and hour angle, but that it is intended in the actual working chart to have every even degree of latitude and hour angle delineated. In Fig. 1 the pointers are set for the sight of Arcturus with an hour angle of 62° and an assumed latitude of 40° N. Thus counting on the chart 62° away from h and placing the point of the dividers on latitude 40° N., the reading is taken at the angle between the legs of the dividers. Assuming that the reading is 56°—18′, if this is subtracted from 90° the difference of 33°—42′ would be the calculated altitude of the star from the assumed position latitude 40° N. longitude 41°—46′ W. If the observed altitude is 33°—38.5′ the line of position is 3.5 miles away from the assumed position and toward the star.

Still keeping one point of the dividers at h, the intersection of the declination line of the star with the hour angle line, place the other point of the dividers at latitude 39°, hour angle 62°, and we will get another reading for the altitude of the body for an assumed position, latitude 39°, hour angle 62°. Supposing this altitude were read 33°—50′, our line of position can then be laid down on the chart or on a separate plotting sheet; which runs 3.5 miles away from latitude 40°, hour angle 62°, toward the star and 11.5 miles away from latitude 39° hour angle 62°, toward the star.

Instead of reading the calculated altitude for two assumed positions, one can define the direction of the line of position by using this instrument to obtain the azimuth. This is done by transposing terms in the astronomical triangle, inasmuch as the instrument is simply a device for solving a spherical triangle, given two sides and the including angle. In the case where we find the altitude, the given parts are the declination, latitude and hour angle. In the case where we wish to find the altitude, the given parts are the declination, latitude and hour angle. In the case where we wish to find the azimuth the given parts are the latitude, altitude and declination. Therefore, to find the azimuth set the scale so that the angle between the legs of the dividers is equal to 90° minus the declination. Then place one point of the dividers on the altitude of the body, and keeping the angle between the legs of the dividers fixed, place the other point of the dividers on the dead reckoning latitude.

The angular value of the difference of longitude shown on the chart between the two points of the dividers will then be equal to the angular value of the azimuth.

In great circle sailing the distance between two points on the earth takes the place of zenith distance, in the astronomical triangle and the difference of longitude takes the place of hour angle. Course takes the place of azimuth. Similarly the instrument can be used to solve lunar distances.

In the case of observation of the planets, the sun, or the moon, which have variable declinations, the declination of the selected planet for the time of sight can not previously be plotted on the chart. Suppose the declination at the time of sight to be 19°—55′ N., the latitude 40° and the hour angle 62° as above; the dividers are set 19°—55′ apart and with one point on the intersection of the Equator with any meridian, the other or northern point is caused to fall on the same meridian, which will indicate the imaginary declination line at the chosen meridian. With one point of the dividers at this declination point, the dividers are turned about and the point which was formerly on the Equator is adjusted so as to be placed at the intersection of hour angle 62° and latitude 40°. The angle between the legs of the dividers will read the zenith distance of the body and as before 90° minus the zenith distance will give the altitude of the planet at the time of observation.

Another, and perhaps easier, way of solving the above problem with this instrument would be to set the instrument on the observed altitude. Place one point of the dividers at $h$, the intersection of the declination line, with any convenient hour angle; and the other point of the dividers can now be made to describe a curve by rotating the dividers, one point being fixed at $h$, the intersection of the dividers being fixed at the top of the standard, and the other point of the dividers being made to describe a line by extending or retracting the extensible arm.

The line thus described on the chart is the gnomonic projection of the circle of equal altitudes, and for any desired latitude as 40° N., corresponding longitude can be read right off the chart or for any convenient hour angle, such as 62°, the corresponding latitude can be read right off the chart. This corresponding latitude or longitude can be read with great exactness by using the dividers themselves. In the case of latitude, for instance, keep one point in place on the chart, turn the dividers over, bringing the other onto the Equator, both points of the dividers then being on the same hour circle. The angle on the scale of the dividers then reads the exact latitude of the position.

I claim:

1. In a device for determining by nautical astronomy a line of position on the terrestrial sphere, the combination of a gnomonic chart of a portion of the sphere, said chart having an opening at its point of tangency, and a pair of dividers including a supporting standard erected at the point of tangency of the chart and extending through said opening and perpendicular to the plane of the chart, said dividers having universally articulated arms, means for pivotally connecting said arms to each other and to the supporting standard and the axis of said pivotal means being spaced from the plane of the chart a distance equal to the radius of the terrestrial sphere for the scale on which the chart is based.

2. In a device of the class described, the combination of a flat chart support provided with a countersunk socket, a standard having a plug at its lower end adapted to be intruded through appropriately located openings in the charts positioned on the support and mounted in said counter sunk socket, said standard being of two parts relatively adjustable in a vertical direction, and a pair of dividers having legs pivotally connected to the upper of said two parts, said standard when located with its plug in the socket acting to locate the apex of the dividers and the chart on the support relative to each other.

3. In a device of the class described, the combination of a flat chart support, a socket fixedly secured to the support, a standard demountably positioned in the socket and extending perpendicular to the plane of the support, a pair of dividers carried by the standard, means mounting the dividers on the standard for universal articulation about a point spaced a definite distance from the plane of the support, and a scale carried by one of the arms for indicating the angular distance between the arms of the dividers.

4. In a device of the class described, the combination of a flat chart support provided with a socket adapted to register with a hole in the chart on the support, a pair of dividers having its apex positioned a definite distance from the plane of the support and having the legs mounted for universal articulation about said fixed apex, and having a supporting standard with a broad base for securing the chart on the support and with a plug for engaging in the socket to locate the apex relative to the hole in the chart and thus relative to other marks on the chart, means carried by the dividers for indicating the angle between the legs of the dividers, said means including a scale graduated to permit a reading of the angle between the arms in terms which are the complement of the angle between the arms.

5. In a device of the class described, the combination of a chart support, a standard on said support for securing a chart in fixed position on the support and positioning a pair of dividers, with its axis positioned a known distance above the support, said standard provided with means for adjusting the distance of the axis from the support to compensate for expansion, contraction and other variation in the dividers, standard, or in any chart positioned on the support.

6. In a device of the class described, the combination of a standard, a support therefor, a pair of legs pivotally carried by the standard and means for mounting the same for universal articulation about a point spaced above the support, said standard comprising two parts relatively adjustable in a vertical direction for permitting a setting of said point at a desired distance from the support, and means for securing the parts in their adjusted position, thereby to secure the point of articulation of the legs relative to the support.

Signed at Lakewood in the county of Ocean and State of New Jersey this 12th day of July, A. D. 1928.

MAURICE RUMFORD PIERCE.